Aug. 26, 1969   W. H. PRICE ET AL   3,462,924
LAWN MOWER CONTROL
Filed Aug. 16, 1965   2 Sheets-Sheet 2

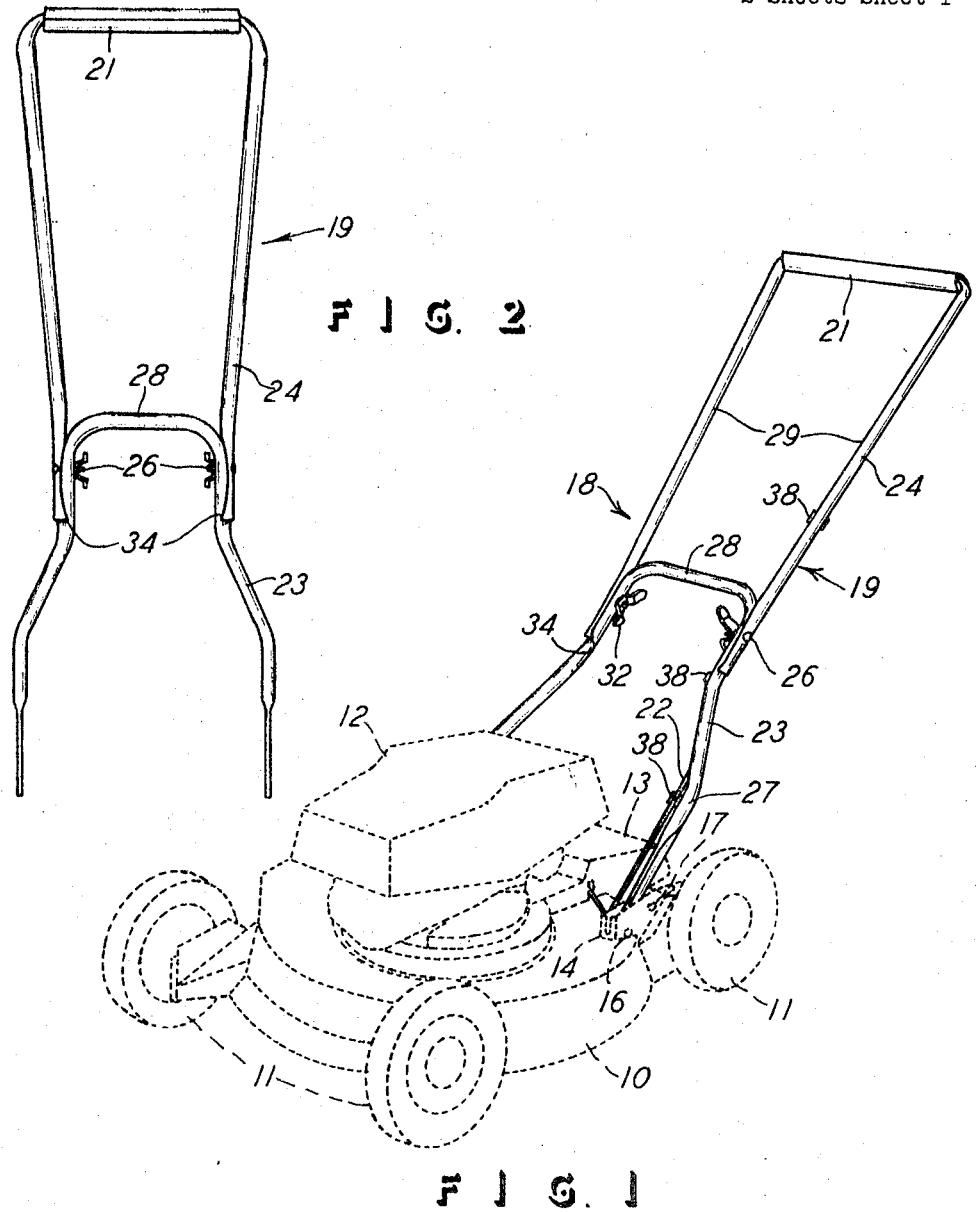

INVENTORS:
WARREN H. PRICE
DONALD G. ERICKSON

BY: *Arthur J. Hansmann*
ATTORNEY

{ # United States Patent Office

3,462,924
Patented Aug. 26, 1969

3,462,924
LAWN MOWER CONTROL
Warren H. Price, South Milwaukee, and Donald G. Erickson, Racine, Wis., assignors to Jacobsen Manufacturing Company, Racine, Wis., a corporation of Wisconsin
Filed Aug. 16, 1965, Ser. No. 480,051
Int. Cl. A01d 35/26; B62b 3/02
U.S. Cl. 56—25.4                                6 Claims

ABSTRACT OF THE DISCLOSURE

A lawn mower control including two U-shaped handle pieces, with the legs of one piece pivotally attached to the mower, and with the legs of the other piece pivotally attached to the first piece. The two pieces are therefore arranged to present a rigid and extended handle in the operating position, since there is a locking bolt connecting them together, and they are arranged to fold compactly with the mower in the inoperative position. A hand grip portion is movable on the handle, and a control cable extends from the hand grip portion down to the mower for operating control of the mower. Means are provided on the handle pieces for assuring pivoting of the pieces only in the direction which will cause them to fold compactly with the mower.

---

This invention relates to a lawn mower control, and, more particularly, it relates to a combined lawn mower and foldable handle with a control for the lawn mower.

It is common practice to have a lawn mower handle detachable from the lawn mower for the purpose of either shipping or storing the lawn mower even between the times that the mower is used on the lawn. Further, it is common practice to have the lawn mower handle disassembled so that at least a part of the handle can be placed in a position other than the normal position extending a substantial distance from the mower. Of course when the handle extends from the mower it is in the way when the mower is not being used as well as when the mower is to be shipped. Of course it is further common practice to ship a mower with the usual two pieces of handle disassembled and placed within the shipping carton so as not to occupy a projected area greater than that of the mower itself. Of course even when the handle is disassembled for shipping, the handle must again be attached to and assembled with respect to the lawn mower after it arrives at the store or the customer's location. Also, it is known that a lawn mower handle can be pivotally attached to the mower and it can be arranged in two pieces which are pivoted together by a single pin or bolt on each side so that the handle can be folded compactly with the mower without any disassembly. In this arrangement of folding the handle with the mower, the mower can then be placed in a shipping carton after it is fully assembled and it can remain fully assembled when it is passed on to the customer. The foldable handle type mower is also convenient for storing the mower in a garage or like storage space in that it does not require the handle be taken off the mower in order to make the unit compact for storing.

It is a general object of this invention to provide a combined mower and foldable handle and with the handle having a control extending from a convenient location for hand manipulation by the operator and down to the mower itself. In accomplishing this particular object, it is significant that the combination can be achieved with the desirable results of being able to fold the handle compactly with the mower for the purpose of shipping and storing the mower, and no disassembly or detachment of the handle is necessary.

Another object of this invention is to provide a lawn mower control which is easy and convenient for the operator to manipulate in controlling the speed and direction of the mower, and which is easy to manufacture and maintain as well as being reliable in its operation and being arranged to be operable in a natural manner with respect to maneuvering the control for forward motion of the mower and for maneuvering it to stop the mower. That is, the control is so arranged that when the operator wants to move forward he will urge the control in a direction simulating forward movement, and when he wishes to stop the mower, he will urge the control in a direction simulating rearward movement of the control.

Still another object of this invention is to provide a lawn mower control including a foldable handle pivotally mounted on the mower such that the handle may be disposed readily and easily in either the inoperative or folded position and in the extended or operative position, and particularly, the mower cannot be damaged in that the handle cannot be folded in the wrong direction. To accomplish this object, a stop is provided so the operator cannot inadvertently fold the handle in the wrong direction to possibly damage the handle and the other parts of the control.

Still a further object of this invention is to provide a lawn mower control which can be incorporated in the mower handle with the handle being a foldable type capable of being disposed in the folded position and also being capable of being extended without requirements of any tools for either folding or extending the handle as mentioned. Further, in providing this foldable handle control, the parts of the control are never detached so that they cannot become misplaced or assembled in the wrong manner.

An important object of this invention is to provide a lawn mower control which includes the mower handle arranged to be foldable with the mower in a collapsed position and also arranged to have a control for running the mower engine as well as steering and tipping the mower, with the lawn mower control all being in this common construction which is primarily a handle arranged such that the operator grips in one place for both the steering, and forward control of the mower, as well as the usual tipping control of the mower for turning a mower which has four wheels, such as the common rotary type mower.

Other objects and advantages will become apparent upon reading the following description in light of the accompanying drawings, wherein:

FIG. 1 is a front perspective view of a lawn mower control attached to a rotary type lawn mower shown in dotted lines.

FIG. 2 is a plan view of the lawn mower control of FIG. 1.

Figure 3:
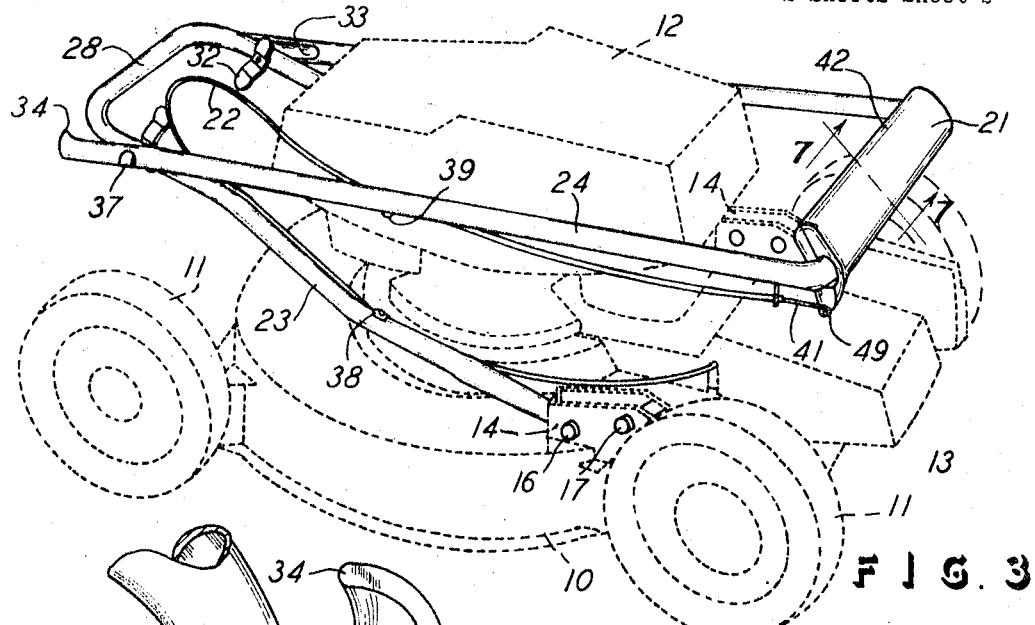
FIG. 3 is a side perspective view of the combination of FIG. 1 but showing the control in the folded and compact position with respect to the mower again shown in dotted lines.

The dotted lines of FIGS. 1 and 3 show a conventional type of rotary lawn mower having a housing 10 and four wheels 11. An engine 12 is mounted on the housing 10 and extends thereabove generally within the projected vertical lines designating the horizontal limits of the housing 10. In any conventional manner, the mower also has its rear wheels 11 arranged as traction wheels to drive
} the mower in the forward direction. A cover 13 encloses a combined clutch and drive transmission which transmits the power of the engine 12 to the rear wheels 11 through the axle of the rear wheels 11. Such connection is in a conventional manner and need not be specifically shown in order for one skilled in the art to have a full disclosure of this invention.

The mower also has a channel 14 which supports a horizontally disposed pin 16 and a second horizontally disposed pin 17, as best shown in FIG. 3. There is of course a channel 14 on each side of the mower, as shown. The mower has a control, generally designated 18 and including a two-piece handle 19, a rotatable grip 21 and a control cable 22.

The two-piece handle 19 includes a lower U-shaped portion 23 and an upper U-shaped portion 24 with the two portions being pivoted together by an elongated bolt 26 on each side of the handle as shown. Also, the free ends 27 of the handle lower portion 23 are pivotally connected to the mower by the two pins 16, in the usual manner. Thus the handle 19 can pivot with the mower and it does so about the pins 16. The pins 17 restrict the rearward pivotal movement of the handle 19, and thus the front end of the mower can be raised off the ground when the control grip 21 is pressed downwardly such that the mower is tipped up about its rear wheels 11 and the handle is tipped down about the rear wheels 11 at their point of contact with the ground.

Figure 7:
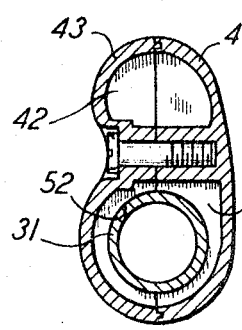
FIG. 7 is a sectional view of the handle and its grip with the section being taken on the line 7—7 of FIG. 3.

The handle lower portion 23 thus has the two legs or free ends 27 and the cross portion 28. Likewise, the handle upper portion 24 has the two free ends or legs 29 and a cross portion 31, as shown in FIG. 7. Both handle pieces 23 and 24 are U-shaped and pivotally connected at their mid-point with respect to their total length from the pins 16 to the hand grip 21.

FIG. 3 shows the handle in the folded position, and here it will be noted that the lower piece 23 pivots forwardly about its mounting pins 16 such that the cross piece 28 is adjacent the mower front wheels 11. The handle upper portion 24 is shown pivoted rearwardly with respect to the lower portion 23, and it will further be noted that both portions 23 and 24 are of a size sufficient to encircle the engine 12 and actually be disposed below the top level of the engine 12 adjacent thereto and compact therewith. Thus the handle 19 in the folded position of FIG. 3 does not extend beyond the horizontal plane on the top surface of the engine 12 in that the handle extends below this horizontal plane. Also, the handle does not extend beyond the vertical plane of the side limits of the mower itself, and thus the handle does not occupy a box larger than that occupied by the mower itself. The entire unit can therefore be placed in the box when the handle is folded as shown in FIG. 3. Of course the unit can also be placed in the FIG. 3 position when it is stored in a garage or the like.

It will be further noted that only one bolt 26 is required on each side of the handle 19, and the bolt extends through the legs 29 and the legs 23, and each bolt has a wing nut 32 threaded thereon. The nut 32 is shown to be very large so that it can be tightened and loosened simply by hand, no tools are necessary for the purpose. The two bolts 26 are on the same axis so that they provide the pivot axis for the two handle pieces 23 and 24, and only loosening of the nuts 32 is necessary for pivoting the handle between the FIG. 1 and the FIG. 3 positions. The handles are preferably made of tubular material having rounded or arcuate outer surfaces, and thus the ends of the legs 29 are recessed at 33 to nest with the cylindrical shape of the upper ends of the legs 27 when the handle is in the operative position of FIG. 1. This of course provides for a rigid handle through the two portions 23 and 24 so only a single bolt 26 is employed on each side of the handle 19.

Figures 4, 5, 6:
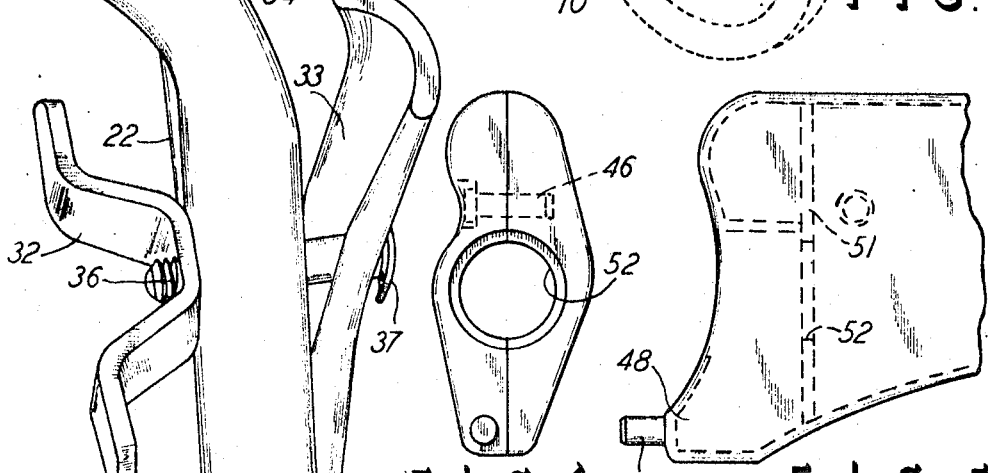
FIG. 4 is an enlarged view of a fragment of the handle with the two pieces thereof being in the folded position.
FIG. 5 is a rear elevational view of an end fragment of the handle grip.
FIG. 6 is an end elevational view of FIG. 5.

Further, it is important to note that the lower ends of the legs 29 have projections or flanges 34 which extend over the legs 27 when the handle is in the aligned position, as shown in FIGS. 1 and 2. The flanges 34 abut the upper surfaces of the legs 27 and thereby prevent the handle portion 24 from pivoting upwardly about the bolts 26 from the FIG. 1 position. This assures that the user cannot fold the handle 19 in the wrong direction in that he must pivot the upper piece 24 downwardly in the FIG. 1 position so that the flanges 34 will directly move away from the legs 27 since the flanges serve as a stop or stop means and cannot clear the legs 27 in the other direction. This feature of assuring proper folding is enhanced by the fact that the bolts 26 limit the loosening of the wing nut 32 so that the legs 29 cannot move away from the legs 27 to a point where the flanges 34 would pass by the legs 27 if the folding were in the wrong direction. Such limiting is achieved simply by having the bolts 26 serve as limits through their threads indicated 36 being upset so that the nuts 32 cannot be loosened too far and certainly cannot be removed from the bolts 26. Thus the length of the bolt 26 from the head 37 to the threads 36 is such that it permits the handle to fold in the proper direction, but does not permit the flange 34 to clear the leg 27 if folding is attempted in the other direction. Accordingly, FIG. 4 shows that the flange 34 is only on the top side, and it is not on the bottom side, of the handle upper piece 24. Also, FIG. 2 shows the flange 34 extends halfway over the entire top side of the handle lower piece 23.

FIGS. 1, 3, and 4, show that the control cable 22 extends for the length of the handle 19 and along the left side thereof when facing in the forward direction of mower movement. The control cable 22 also extends below the cross piece 28 of the handle lower piece 23, and thus the cable 22, being inherently a flexible cable, will be foldable into the position shown in FIG. 3 when the handle is folded. Clips 38 are connected to the handle to secure the cable 22 thereto. The clips are attached to the handle by means of screws 39, and the clips are located adjacent the pivot axis defined by the two bolts 26, and thus the location of the cable 22 below the cross piece 28 and the direction of folding described is significant so that the cable will negotiate the fold and of course will not be broken. Thus there is one clip 38 on the upper handle piece 24 and two clips 38 on the lower handle piece 23. The cable is shown to tautly extend parallel to the handle from the grip 21 to the lowest one of the clips 38. The cable 22 contains a flexible wire 41 which is of course slidable along the cable 22 for axial movement of the wire 41 in the actuation of the clutch within the housing 13. Since the mower has a drive means for the rear traction wheels 11, the mower is of the type commonly known as the self-propelled rotary mower, and the operator controls the forward movement by engagement and disengagement of the clutch within the housing 13, all in any well-known manner.

The control grip 21 is rotatably mounted on the handle cross piece 31, and FIG. 7 particularly shows that the grip 21 has an eccentric or offset upper portion, generally designated 42. This portion 42 is normally directed upwardly, when the handle is in the FIG. 1 position, and the operator would of course grip the member 21 and move the upper portion 42 forward to engage the clutch and rearward to disengage the clutch. This is of course the normal direction of movement for inducing the mower to move forward and for stopping the forward movement, respectively. FIGS. 5, 6, and 7 show that the grip 21 is made in two halves 43 and 44 which are front and rear halves respectively. The halves mate together as shown in FIGS. 6 and 7 to encircle the cylindrical handle portion 31 and be rotatable thereon as mentioned. Grooves 46 extend between the two halves 43 and 44 for securing them snugly on the handle portion 31.

Also, the grip 21 has a pin 47 on an eccentric portion 48 extending below the tubular handle portion 31. The wire 41 is then connected to the pin 47 by means of a screw 49 so that rotation of the grip 21 will induce the axial motion of the wire 41, as desired. Webs 51 and holes 52 are along the grip 21.

It will thus be understood that the grip 21 is snug with the handle cross piece 31 so that the mower can be both steered and tipped while the operator is holding the grip 21. Further, it will be seen that the grip portion 42 extends above the handle portion 31 and thus rotation of the offset or eccentric portion 42 about the handle portion 31 will induce the natural action of engaging and disengaging the mower mechanism mentioned.

While a specific embodiment of this invention has been shown and described, it should be obvious that certain changes could be made in the embodiment and the invention should therefore be determined only by the scope of the appended claims.

What is claimed is:

1. A foldable lawn mower handle with a control for the lawn mower, comprising a two-piece handle including a lower piece pivotally attachable at one end to a lawn mower and including an upper piece pivotally mounted on the other end of said lower piece and extending therebeyond in a plane of alignment therewith, stop means engageable between said pieces for pivotal movement between said pieces to only one side of the plane of alignment of said pieces, said pieces being pivotally connected effectively at the mid-point of the total aligned length of said pieces for pivotally folding compactly to a position adjacent the lawn mower while being pivotally attached thereto, a control cable of a flexible material attached to said two-piece handle and extending tautly therealong and being foldable therewith without detachment from said two-piece handle, a control grip movably mounted on said upper piece, said control cable being connected at one end to said control grip and at the other end to the lawn mower for running control of the latter by said control grip.

2. A combined lawn mower and foldable handle with a control for the lawn mower, comprising a lawn mower including an engine on the top thereof, two U-shaped handle pieces extending upwardly at an inclined angle from said lawn mower in an operating position and including a lower piece pivotally connected at its free ends to said lawn mower on opposite sides of said engine and including an upper piece pivotally mounted at its free ends on the other end of said lower piece and extending therebeyond in a plane of alignment therewith, a flange on only one side of said free ends of said upper piece for pivotal movement between said pieces to only one side of said plane of alignment of said pieces and to prevent pivotal movement to the other side of said plane of alignment, said pieces being of a U-shaped size sufficient to encircle said engine in the folded position and being pivotally connected effectively at the mid-point of the total aligned length of said pieces for pivotally folding compactly to an inoperative position adjacent to and laterally surrounding said lawn mower engine while being pivotally attached to said lawn mower, a control cable of a flexible material attached to said handle pieces and extending tautly therealong and along said one side of said plane of alignment and below the cross-portion of said lower piece of said handle and being foldable with said handle without detachment therefrom, a control grip movably mounted on said upper piece, said control cable being connected at one end to said control grip and at the other end to said lawn mower for running control of the latter by said control grip.

3. A foldable lawn mower handle with a control for the lawn mower, comprising a handle of two inverted U-shaped pieces including a lower piece pivotally attachable at its free ends to the lawn mower to extend inclined upwardly therefrom and including an upper piece pivotally mounted on the other end of said lower piece and extending therebeyond in a plane of alignment therewith, a flange on only one side of each leg of said upper piece and abutting said lower piece at a location below the pivot axis between said pieces and in the plane of folding and being arranged for pivotal movement between said pieces to only one side of said plane of alignment of said pieces, said pieces being pivotally connected effectively at the mid-point of the total aligned length of said pieces for pivotally folding compactly to a position adjacent the lawn mower while being pivotally attached thereto, a control cable of a flexible material attached to said handle and extending tautly therealong and beneath said handle to said side to which said handle folds and being foldable therewith without detachment from said handle, a control grip movably mounted on said upper piece, said control cable being connected at one end to said control grip and at the other end to the lawn mower for running control of the latter by said control grip.

4. A foldable lawn mower handle with a control for the lawn mower, comprising a handle of two inverted U-shaped pieces including a lower piece pivotally attachable at its free ends to the lawn mower to extend inclined upwardly therefrom and including an upper piece pivotally mounted on the other end of said lower piece and extending therebeyond in a plane of alignment therewith, a flange on only one side of each leg of said upper piece and abutting said lower piece at a location below the pivot axis between said pieces and extending halfway across the upper surface of said lower piece in the plane of folding and being arranged for pivotal movement between said pieces to only one side of said plane of alignment of said pieces, a pivot bolt on each side of said handle for securing said pieces together at their pivot axis and at the mid-point of the total aligned length of said pieces for pivotally folding compactly to a position adjacent the lawn mower while being pivotally attached thereto, said pivot bolt having a nut thereon and limit means for loosening of said nut to only a limit position for folding said handle and with the limit position arranged that the effective length of said bolt when loosened retains said flange in alignment for abutting said lower piece, a control cable of a flexible material attached to said handle and extending tautly therealong beneath said handle to said side to which said handle folds and being foldable therewith without detachment from said handle, a control grip movably mounted on said upper piece, said control cable being connected at one end to said control grip and at the other end to the lawn mower for running control of the latter by said control grip.

5. A foldable handle for a lawn mower, comprising two U-shaped pieces, one of said pieces being pivotally attachable at its free ends to a lawn mower and extending at an upwardly inclined angle therefrom, a pivot bolt on the upper end of each side of said one piece and forming a pivot axis thereacross, the free ends of the other of said pieces being pivotally mounted on said pivot bolts and with said other piece extending in alignment with said one piece, a nut on each of said pivot bolts and together having a stop to have said nut limited in the extent it can be loosened on said bolt, a flange on only one side of each of said free ends of said other piece and extending in overlapping abutment with said one piece in the plane of pivot for preventing pivot of said other piece in one direction in the plane of pivot, the limit of loosening said nut on said bolt being within the overlap of said flange on said other piece to insure the folding of said handle in the other direction in the plane of pivot.

6. A foldable handle for a lawn mower, comprising two U-shaped pieces, one of said pieces being pivotally attachable at its free ends to a lawn mower and extending at an upwardly inclined angle therefrom, a pivot bolt on the upper end of each side of said one piece and forming a pivot axis thereacross, the free ends of the other of said pieces being pivotally mounted on said pivot bolts and with said other piece extending in a plane of alignment with said one piece, a flexible control cable attached to each of said pieces and extending therebelow from the upper end of said other piece to the lawn mower, a nut on each of said pivot bolts and being limited in the extent it can be loosened on said bolt, a flange on only one side, with respect to said plane of alignment, of each of said free ends of said other piece in overlapping abutment with said one piece on said one side for preventing pivot of said other piece toward said one side, the limit of loosening said nut on said bolt being within the overlap of said flange on said other piece to insure the folding of said handle only toward the other side of said plane of alignment.

References Cited

UNITED STATES PATENTS

| | | | |
|---|---|---|---|
| 2,680,947 | 6/1954 | Weimer | 56—26 |
| 3,357,716 | 12/1967 | Musichuk | 280—47.37 |
| 1,960,201 | 5/1934 | Braun. | |
| 2,727,753 | 12/1955 | Johnson et al. | |

ANTONIO F. GUIDA, Primary Examiner

U.S. Cl. X.R.

16—111; 280—47.37